J. C. HAYWARD.
LOCOMOTIVE FIRE-BOX.

No. 192,507. Patented June 26, 1877.

2 Sheets—Sheet 1.

WITNESSES
Franck L. Durand
John Schroeder

INVENTOR
Jno. C. Hayward
Alexander Mason
ATTORNEYS

2 Sheets—Sheet 2.

J. C. HAYWARD.
LOCOMOTIVE FIRE-BOX.

No. 192,507. Patented June 26, 1877.

WITNESSES
Franck L. Durand
John Schroeder

INVENTOR
Jno C. Hayward

Alexander Mason
ATTORNEYS

UNITED STATES PATENT OFFICE.

JOHN C. HAYWARD, OF SELMA, ALABAMA.

IMPROVEMENT IN LOCOMOTIVE FIRE-BOXES.

Specification forming part of Letters Patent No. 192,507, dated June 26, 1877; application filed May 17, 1877.

*To all whom it may concern:*

Be it known that I, JOHN C. HAYWARD, of Selma, in the county of Dallas, and in the State of Alabama, have invented certain new and useful Improvements in Locomotive Fire-Boxes; and do hereby declare that the following is a full, clear, and exact description thereof, reference being had to the accompanying drawings, and to the letters of reference marked thereon, making a part of this specification.

The nature of my invention consists in the construction and arrangement of a fire-box for locomotive-boilers, the peculiarities of which will be hereinafter more fully set forth.

To enable those skilled in the art to make and use my invention, I will proceed to describe its construction and operation.

Figure 1:
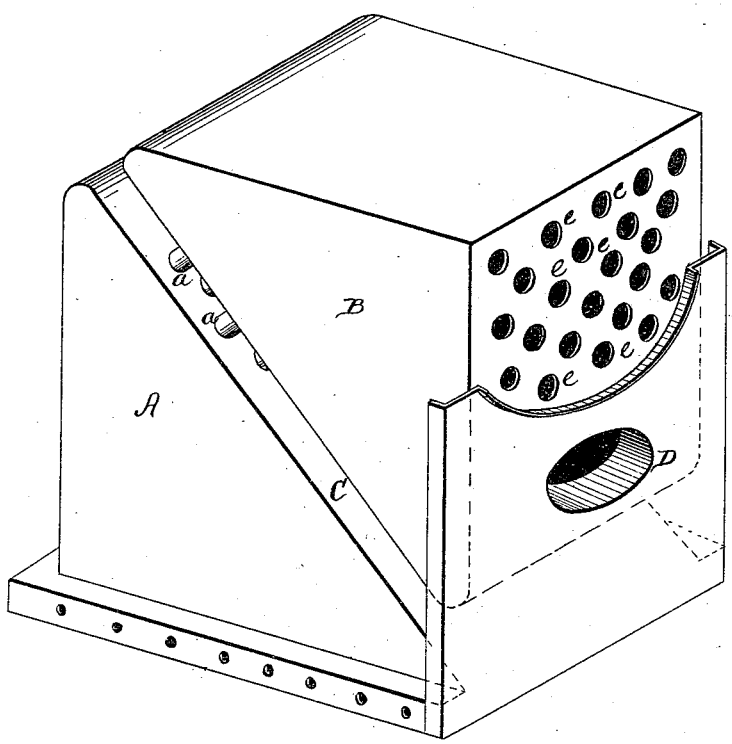
Figure 2:
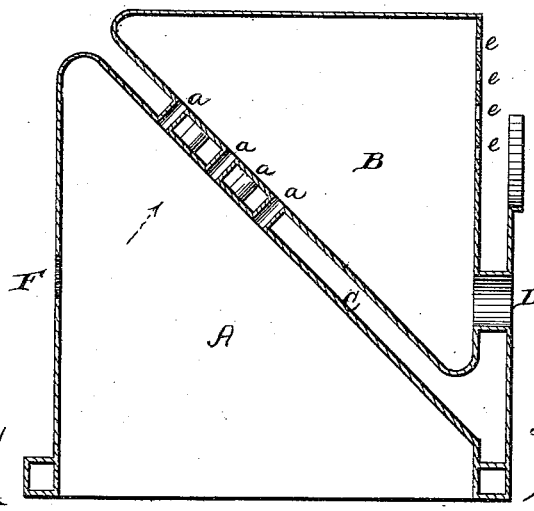
Figure 3:
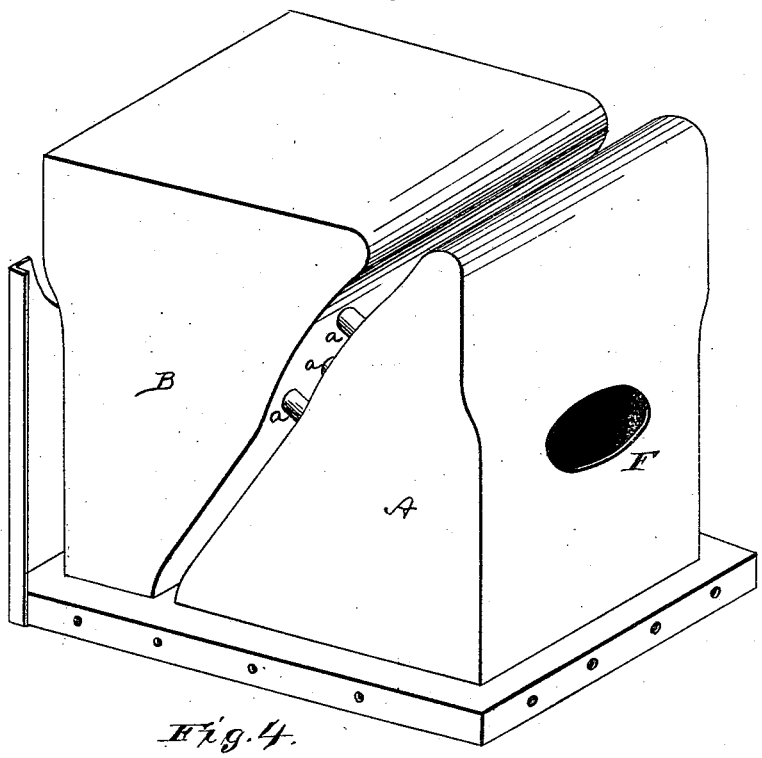
Figure 4:
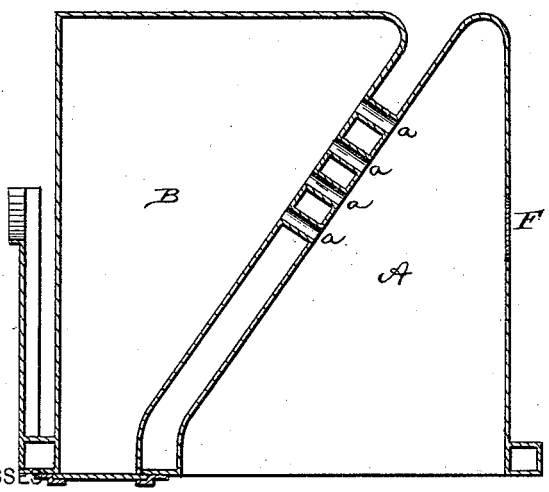

In the accompanying drawings, making part of this specification, Figure 1 represents a back perspective; Figs. 2 and 4, cross-sections, and Fig. 3 a front perspective.

In the figures, A and B represent two triangular fire-boxes, A being the fire-box proper and B the combustion-chamber. These boxes are placed a little distance apart, with the hypotenuse of one facing that of the other. The two boxes are connected together by a series of short flues, *a a*, which are at right angles to the hypotenuse of each.

F represents the fire-door, and D represents a man-hole in the rear water-leg of the fire-box, and which passes into the box B.

C represents a water-space between the two boxes.

When these boxes are inclosed it will be seen that a large water-space is secured.

The water surrounds the two fire-boxes, passing in between them and around the series of flues *a a*.

Air is admitted or steam, if desired, into the combustion-box B, through suitable pipes or flues provided therefor. *e e* are escape-flues.

When fire is kindled in the box A the draft carries the flame up through the flues *a a* and into the combustion-chamber, where it is met by a current of air or steam to complete the combustion of the gases, and to consume in a great measure the smoke arising from the fuel.

The box B may extend all the way down to a level with box A, as seen in Fig. 4, or it may be raised above it at its lower end, as seen in Fig. 2.

Having thus fully described my invention, what I claim as new, and desire to secure by Letters Patent, is—

The independent boxes A and B, constructed and arranged substantially as represented, and connected together by the flues *a a*, whereby a water-space is secured around the boxes, as and for the purpose set forth.

In testimony that I claim the foregoing I have hereunto set my hand this 7th day of May, 1877.

JOHN C. HAYWARD.

Witnesses:
PETER CAMPBELL,
HUGH S. D. MALLORY.